Figure 1:
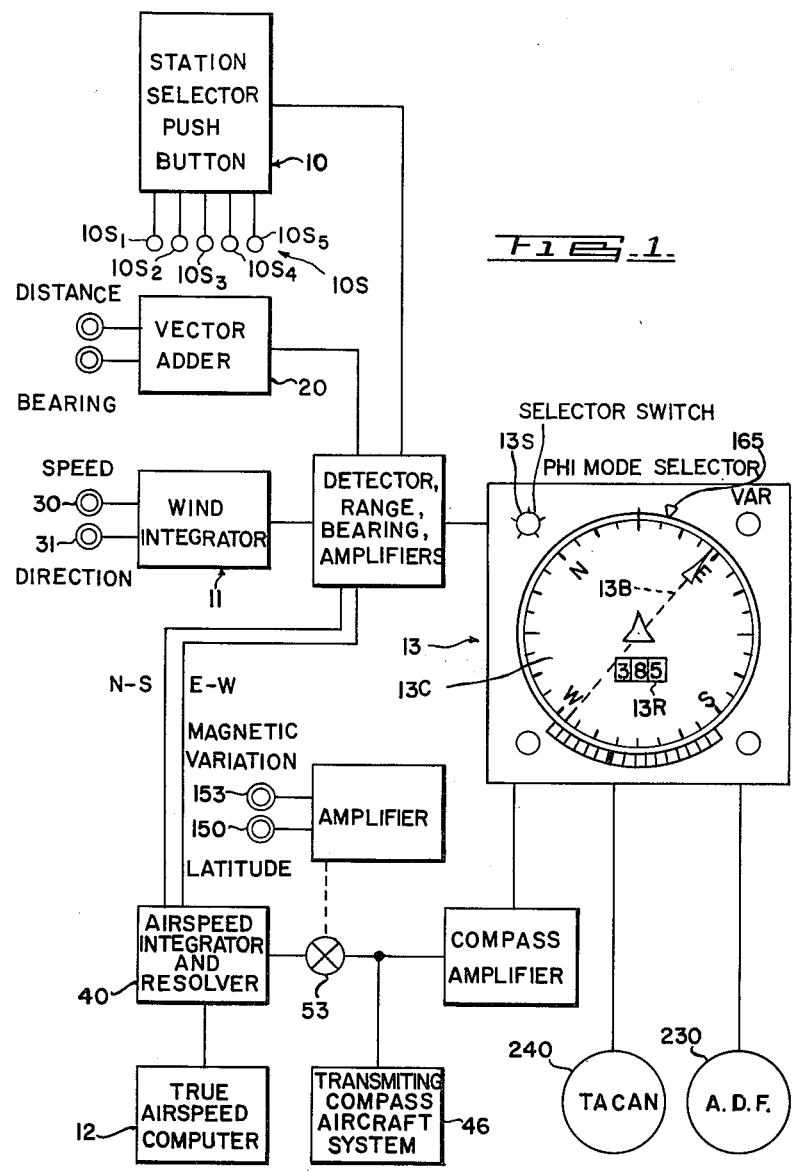

INVENTORS
JERAULD G. WRIGHT
JOHN R. B. STEACIE
JEAN-PAUL DUHAMEL
BY Smart & Biggar
ATTORNEYS.

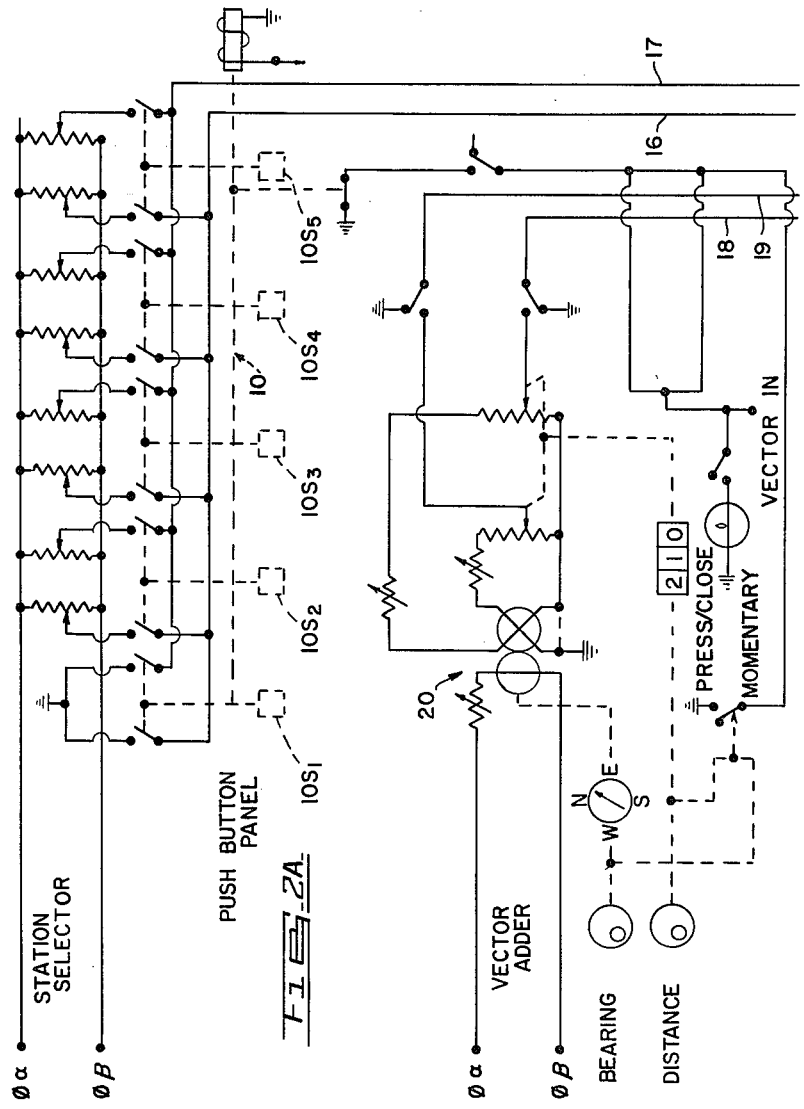

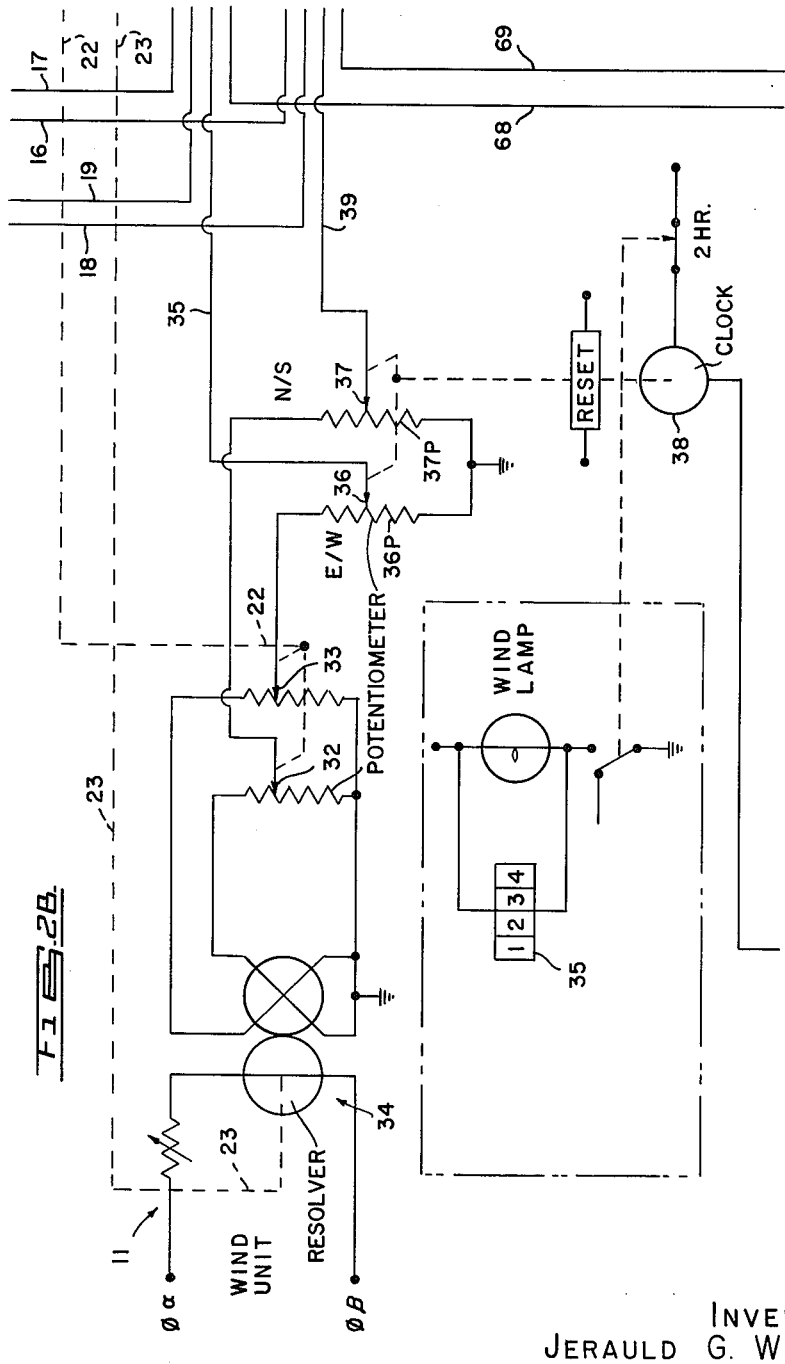

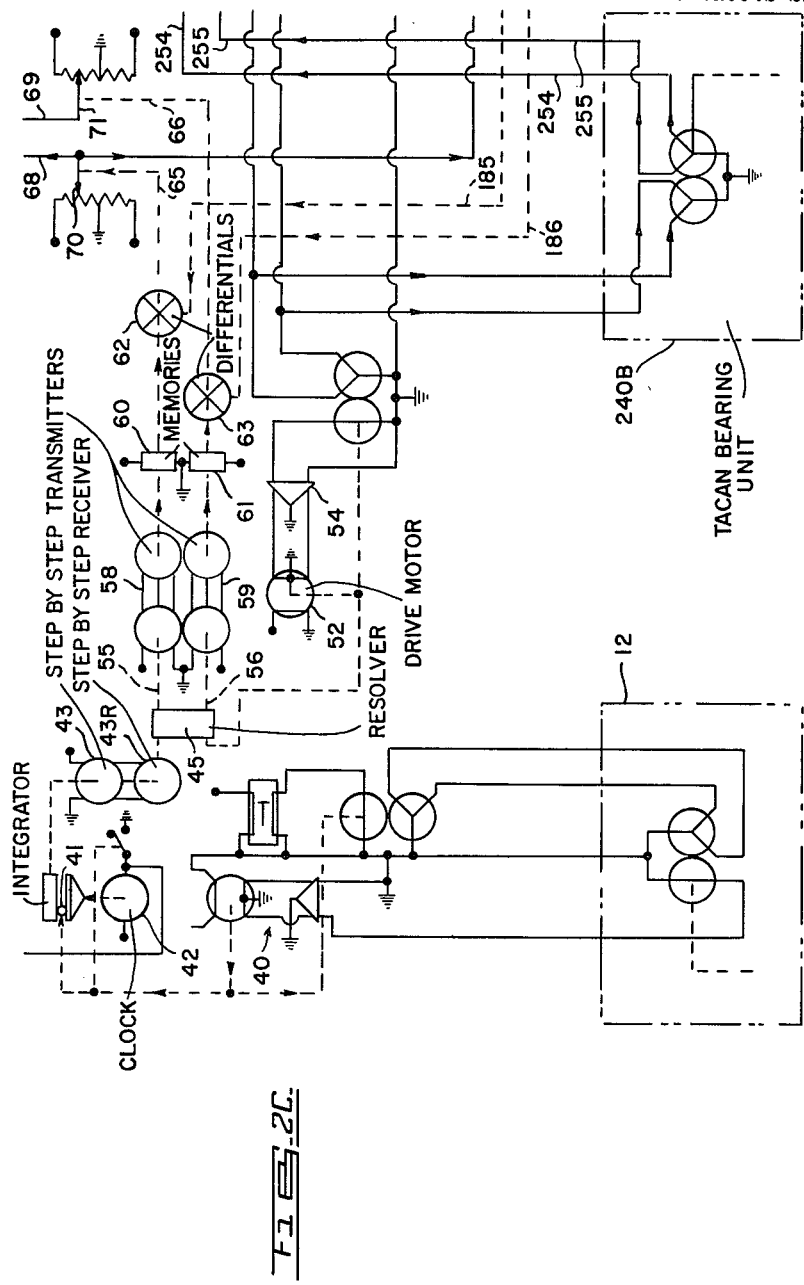

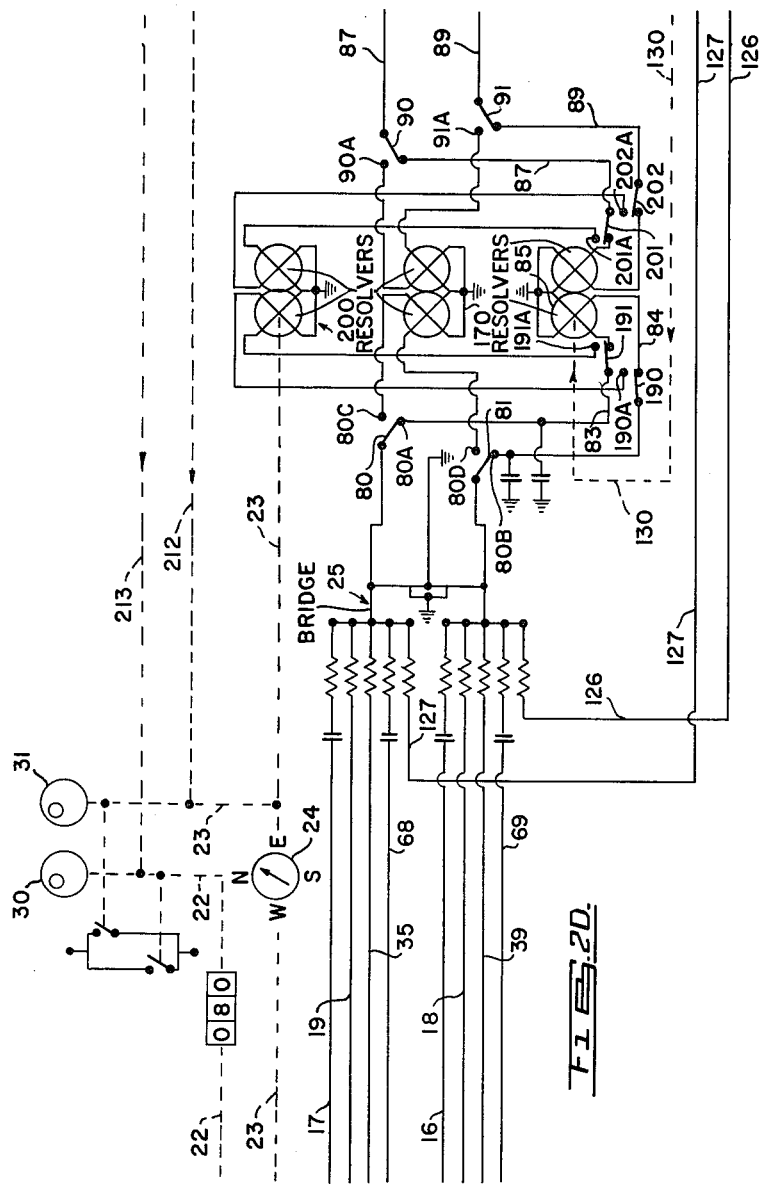

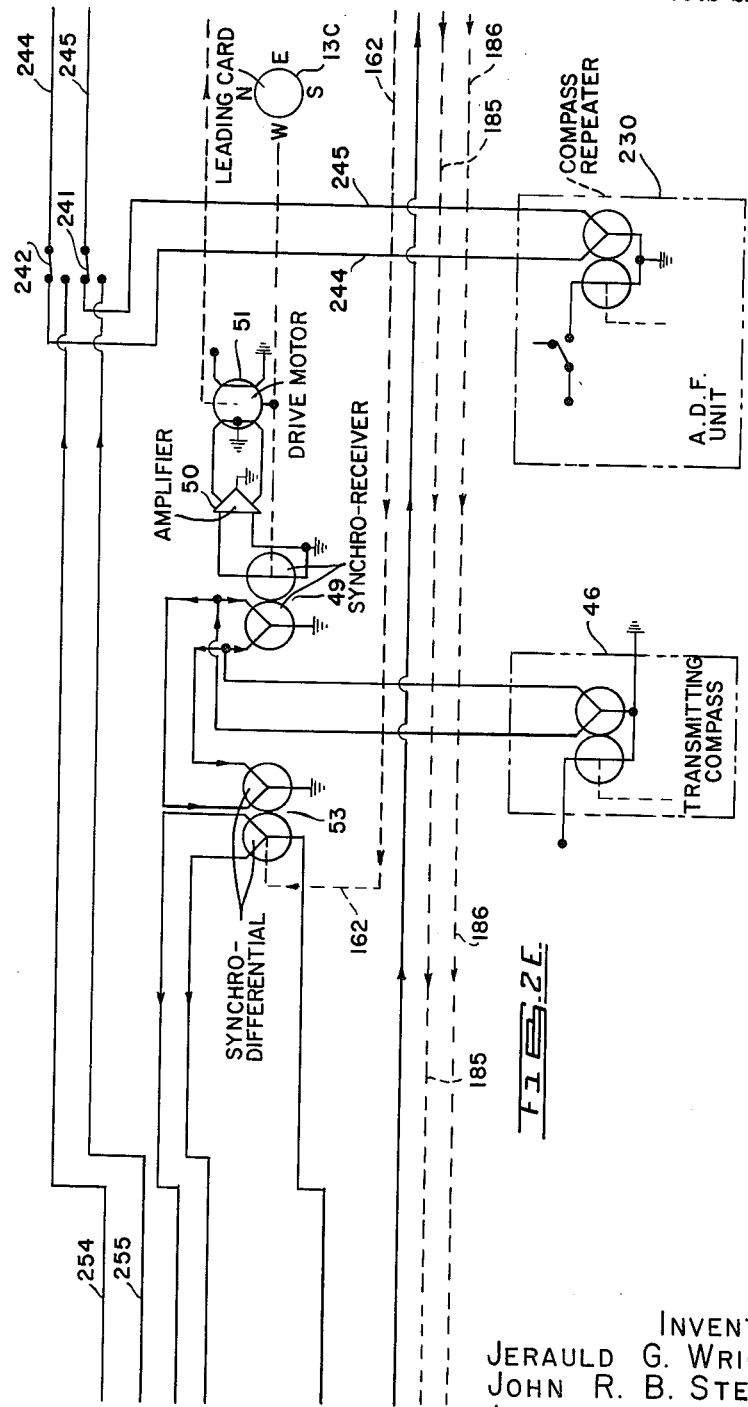

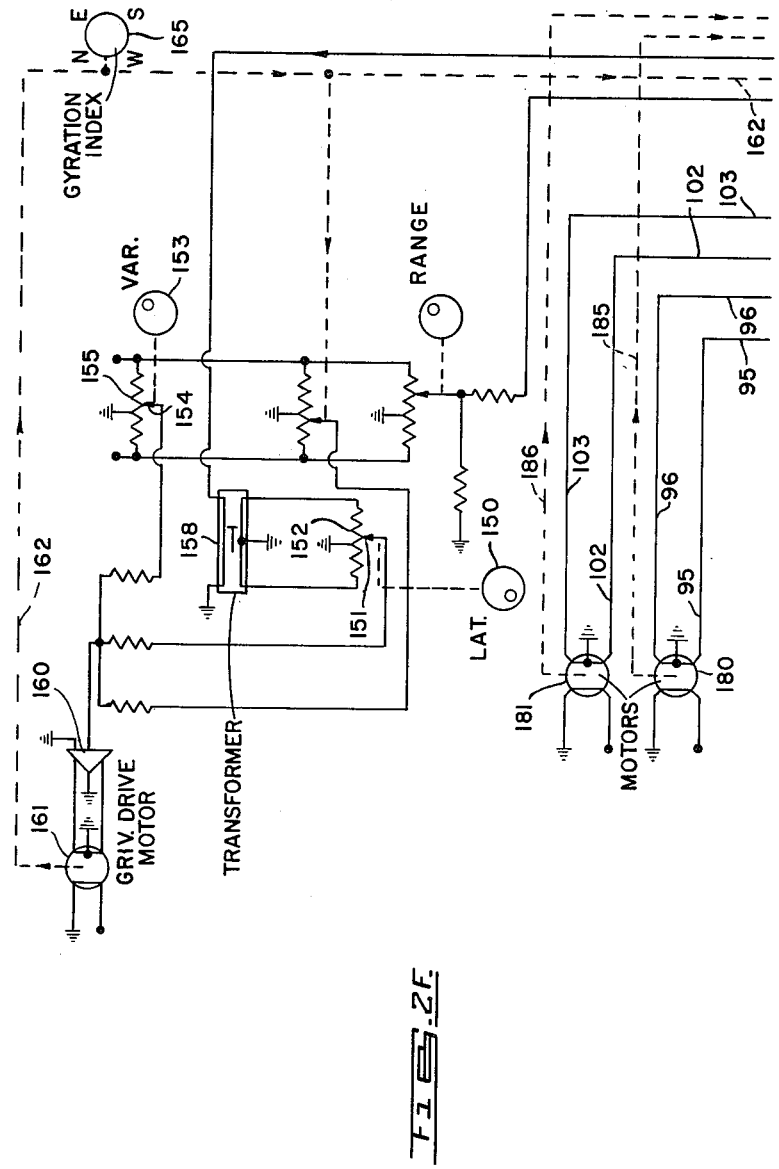

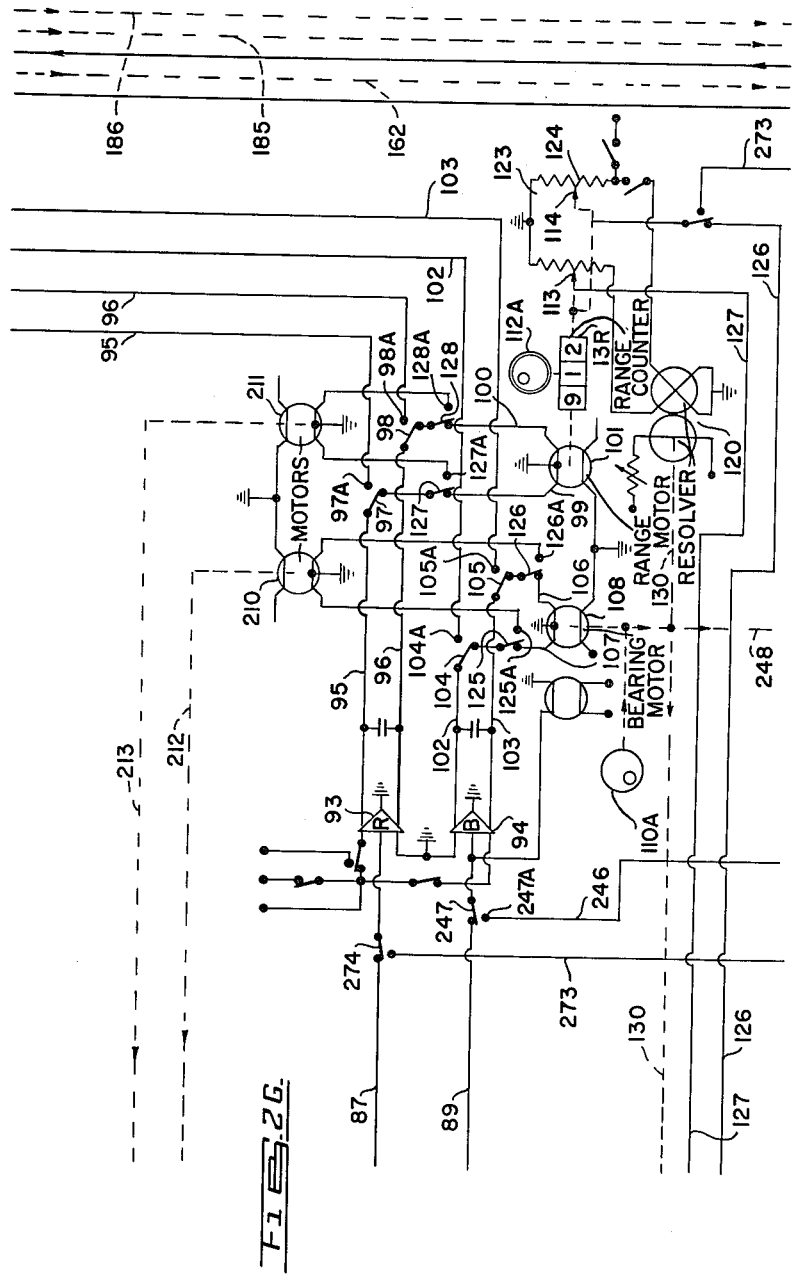

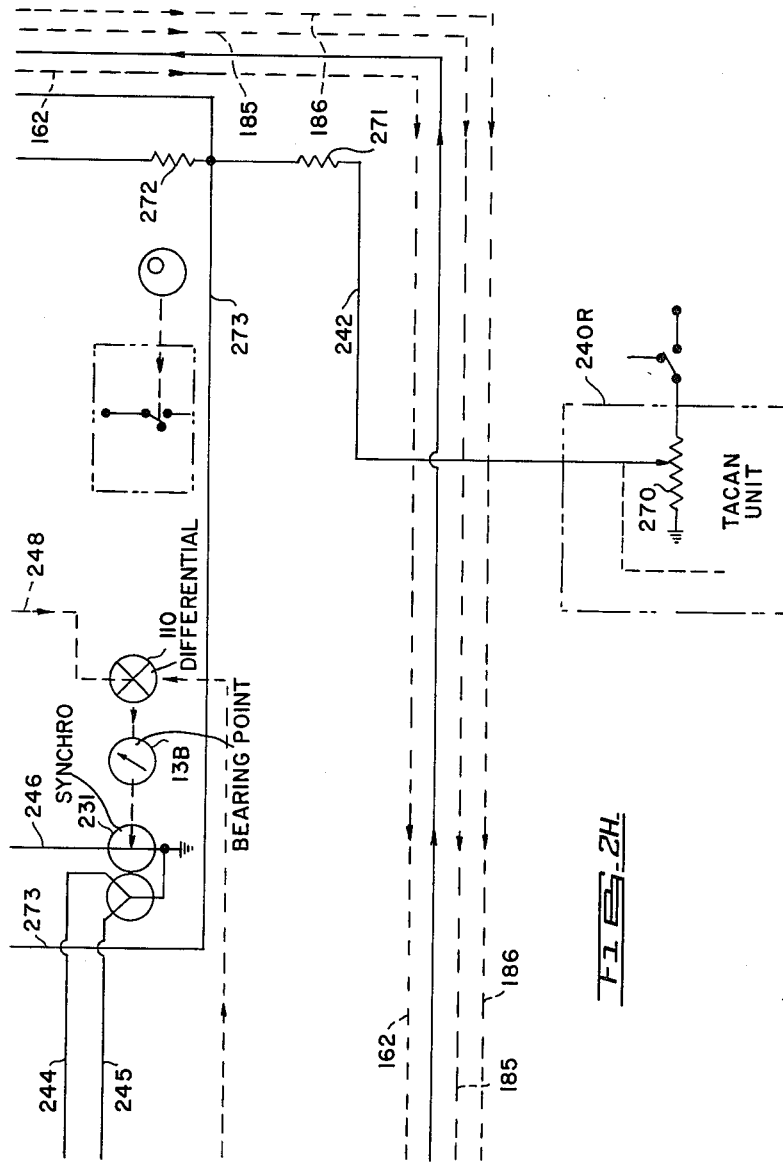

3,217,150
POSITION HOMING INDICATOR

Jerauld George Wright, 48 Mount Pleasant Ave., Dartmouth, Nova Scotia; John Richard Brian Steacie, 1575 Balena Ave., Ottawa, Ontario, Canada; and Jean-Paul Duhamel, 1327 East Ave., R-4, Palmdale, Calif.
Filed Oct. 14, 1960, Ser. No. 62,581
Claims priority, application Great Britain, Oct. 19, 1959, 35,335/59
10 Claims. (Cl. 235—187)

This invention relates to a navigational aid primarily intended for high speed relatively short range aircraft such as fighter interceptors.

The speed at which today's fighter aircraft operate makes time-proven navigational position plot of little consequence. The fighter pilot is concerned mainly with the point to which he is going and the base which he has left rather than with any knowledge of his instantaneous ground position.

In the past instruments have been made which indicate to the pilot a form of chart reference showing by the intersection of cross wires superimposed on a semichartlike reference the position of the point to which the aircraft is going and by means of another indicator the aircraft's position in relation to the cross wires. This type of indication has met with a limited amount of success since clearly the pilot of a high speed aircraft does not wish to concern himself with scale changes of reference or with precision positioning of the aircraft indicator with the cross wires or with remembering the scale to which he is working.

Accordingly the present invention provides a navigational aid adapted to receive as a first input the analogue of the Cartesian coordinates of a selected geographical reference relative to a map grid datum: as a second input; the analogue of aircraft true air speed; as a third input the analogue of aircraft heading; and as fourth and fifth inputs the analogues of wind speed and wind direction, means for summing the input analogues to produce a difference signal analogous to the instantaneous value of the Cartesian coordinates of the selected geographical reference relative to the aircraft's air position, means for converting the difference signal into analogues of polar coordinates of instantaneous range and instantaneous bearing of the aircraft relative to the selected geographical reference and means for utilizing the generated last signal to position a reference pointer to visually indicate the instantaneous bearing to the selected geographical reference and to position means to visually indicate the instantaneous range of the aircraft to the selected geographical reference.

Preferably, means are provided to position compass card means to visually indicate the heading of the aircraft, and wherein differential means are provided to position the said bearing pointer in super imposition on the compass card means whereby to indicate the position of the selected geographical reference relative to the map grid datum.

Preferably a plurality of geographical references or stations, may be selected by means of a station selector device which provides outputs of analogues of Cartesian coordinates of a number of selected geographical references relative to a single map grid datum.

It is a feature of the present invention that the reference pointer which visually indicates the instantaneous bearing and the means which visually indicates the instantaneous range may be cut off from their input sources, reset manually to be in accordance with the known range and bearing to the geographical reference and then at the pilot's discretion, the device may be caused to reject hitherto assumed information with regard wind speed and wind direction and a new wind speed and direction be computed by comparing the inputs to the device with the corrected presentation, alternatively the device may be caused to reject air data information, and by causing it to be compared with the corrected presentation, cause the computer to accept the corrected presentation as a new air plot position.

The following is a description by way of example of one embodiment of the present invention, reference being had to the accompanying drawings in which:

FIGURE 1 is a block schematic diagram and
FIGURE 2 is a functional schematic diagram of the electrical layout of the invention and comprises FIGURES 2A, 2B, 2C, 2D, 2E, 2F, 2G, 2H. A composite FIGURE 2 is obtained by considering FIGURES 2A, 2B and 2C one beneath the other to form the right hand side of the diagram; FIGURES 2D and 2E one beneath the other to the right of and in trim with FIGURES 2B and 2C respectively, and FIGURES 2F, 2G and 2H one beneath the other to the right of FIGURES 2B and 2C with FIGURES 2G and 2H aligning respectively with FIGURES 2D and 2E.

The instrument basically comprises a station selector 10 (FIGURE 1), a wind unit 11, an air unit 12 and a panel-mounted display unit 13.

The station selector 10 is a push-button panel-mounted instrument which is cartridge loaded. The cartridge comprises a plurality of units each comprising a resistance of pre-set value, the resistance value of each unit being such that operation of any one of the selector buttons $10S_1$, $10S_2$, $10S_3$, $10S_4$, $10S_5$ serve to electrically apply to the bridge network 25 (FIGURE 2D) through connections 16, 17, a voltage signal analogous to the Cartesian coordinates of the geographical position of the selected station relative to a map grid datum.

A vector adder unit 20 (FIGURE 2A) provides a generated voltage analogous to the Cartesian coordinates of any selected geographical reference which the operator may select and which has not been allowed for in the station selector. The manner of operation of the unit 20 is exactly the same as the station selector except that it, of course, is not tied to any preset selection. Thus the vector adder may apply to the bridge 25, through connections 18, 19 a voltage analogous to the Cartesian coordinates of any geographical reference with reference to the map datum or alternatively the vector adder unit 20 may be utilized to additionally indicate a vector from any selected station. That is to say, if information is required with regard to a station not allowed for on the station selector, but whose coordinates relative to a provided station are known, the vector of the station not allowed for relative to a map grid datum may be applied to the bridge merely by pushing the button ($10S_1$–$10S_5$) corresponding to the provided station and adding thereto (on the bridge 25) the vector analogue of the unallowed for station relative to the provided station.

The wind unit 11 is manually set up by operation of knobs 30 and 31 (FIGURES 1 and 2D) which, through mechanical connections 22, 23 position wipers 32, 33 (FIGURE 2B) on potentiometers in the wind unit and the rotor of the resolver 34 in accordance with the meteorological wind forecast for the flight duration. The wind direction set at knob 31 and indicated at 24 on the wind unit positions the rotor of the resolver 34 whilst the analogue of wind speed applied to the knob 30 actually mechanically positions the wipers 32, 33 to provide Cartesian coordinates of wind vector. Wipers 36, 37 of potentiometers 36P and 37P are set by a clock mechanism 38 so that the Cartesian coordinates of the wind vector taken from the wind unit on wipers 32, 33 may be multiplied by time by moving the wipers 36, 37 whereby to apply voltages analogous to the accumulated wind vector to the bridge 25 through connections 35 and 39.

An input of true air speed is obtained from a device such as Kollsman true air speed indicator 12 (FIGURES 1 and 2C) and the analogue signal derived therefrom is applied to a conventional servo follow-up unit 40, which mechanically positions the ball-carriage of a ball disc integrator 41 in accordance with the applied analogue of true air speed. A clock mechanism 42 drives the integrator 41 so that a shaft rotation analogous to distance travelled is applied to the step by step transmitter 43 from whence it is applied as a shaft rotation to the mechanical resolver 45 through the step-by-step receiver 43R.

A transmitting compass 46 (FIGURES 1 and 2E) applies the electrical analogue signal of aircraft magnetic heading (it will be appreciated that the input analogue of heading could very well be true or grid heading if desired) to the synchro receiver 49 from whence it is amplified in amplifier 50 and applied to drive motor 51 whereby to position the magnetic heading card 13C. The input analogue signal of heading from the compass 46 is also transmitted to a synchro differential 53 to where an additional compatible analogue input of grivation (to be described more fully hereinafter) is applied to the differential, and the output signal of heading plus grivation is then applied to amplifier 54 (FIGURE 2C) to drive motor 52, whereby a grid heading analogue signal as a shaft rotation is applied to the mechanical resolver 45.

Grid heading is measured relative to a line parallel to the meridian through the map datum point, or to any other arbitrary reference line. The resolver 45 resolves the analogue inputs of distance travelled (from the receiver 43R) and grid heading into analogues of the Cartesian coordinates of east-west grid miles travelled and north-south grid miles travelled along the aircraft heading and these analogues are presented as outputs on shafts 55 and 56 respectively to step by step output transmitters 58, 59, from whence through mechanical memories 60, 61 they are applied to differentials 62, 63. The output analogue signals from these differentials on their shafts 65, 66 mechanically position the wipers of potentiometers 70, 71 to convert these analogue signals into electrical analogues and to apply them to the bridge 25 on connections 68, 69.

The bridge 25 therefore has as a first input the analogue of the Cartesian coordinates of a selected geographical reference (say a base station) relative to a map datum; as a second input the analogue signal of the Cartesian coordinates of aircraft distance travelled along heading; and, as a third input the analogues of the Cartesian coordinates of the accumulated wind speed and direction vector. These input signals produce an inbalance in the bridge 25 and a difference signal is generated which is applied through switches 80 and 81 (FIGURE 2D), their contacts 80A and 80B and lines 83, 84 to a resolver 85 in which the Cartesian coordinates are converted to polar coordinates relative to the instantaneous value of displayed bearing and applied on lines 87, 89 through switches 90 and 91 as inputs to a range amplifier 93 (FIGURE 2G) and a bearing amplifier 94. The range amplifier 93 transmits a signal on lines 95, 96 through switches 97, 98 on lines 99 and 100 to a range motor 101, whilst the bearing amplifier transmits output signals on lines 102, 103 through switches 104, 105 and lines 106, 107 to a bearing motor 108.

The range motor 101 mechanically drives a range counter 13R (see also FIGURE 1) and the bearing motor 108 mechanically drives through differential 110 (FIGURE 2H) a bearing pointer 13B (see also FIGURE 1). The visual presentation therefore on the display unit 13 of the instrument is the range to the selected geographical reference or station and the grid bearing to the selected station relative to the aircraft's air position. The range motor 101 (FIGURE 2G) in addition to driving the range counter 13R, positions through a mechanical connection 112, wipers 113, 114 of potentiometers 123 and 124 and the bearing motor 108 mechanically positions the shaft of a resolver 120. The resolver 120 is electrically connected to the potentiometers 123, 124 and thus their wipers 113, 114 respectively take off and transmit an additional input signal back to the bridge 25 on electrical connection 126, 127. Furthermore a mechanical connection 130 positions the rotor of the resolver 85 (FIGURE 2D) in accordance with the output from motor 108. From this arrangement it will be observed that when the aircraft has reached its destination the range counter will read "0" and the bearing indicator will be free to move in any direction.

Reference has been made hereinbefore to "grivation" (which is applied to the synchro 53 (FIGURES 1 and 2E)) this being the sum of magnetic variation plus the angle of convergence between datum meridian and the meridian of present position. The pilot, by operating the knob 150 (FIGURE 2F) causes the analogue of the approximate latitude in which the aircraft is flying to be taken off the potentiometer 152 by the wiper 151, the latitude potentiometer 152 being excited from an east-west distance signal through transformer 158 and by operating the variation knob 153 causes the slider 154 of potentiometer 155 to be set up in accordance with the prevalent magnetic variation. Thus the output from the network to amplifier 160 is the analogue of grivation error.

This signal is applied to amplifier 160 to drive motor 161 whereby to apply a shaft rotation via mechanical connection 162 to synchro differential 53 (FIGURE 2E) and at the same time to operate the grivation index 165 (FIGURES 1 and 2F) on the instrument.

Referring again to FIGURE 2D, it will be observed that the outputs from the amplifier 25 may, by altering the positions of the switches 80 and 81 to contact their terminals 80C and 80D, cause the output from the amplifier to be applied to a fixed shaft resolver 170. The action to cause switches 80 and 80B against contacts 80C and 80D similarly moves the switches 90 and 91 to their contacts 90A and 91A, thus the resolver 170 is electrically connected to the amplifiers 93 and 94. At the same time switches 97 and 98 in connections 95, 96 close to their contacts 97A and 98A and switches 104, 105 in connections 102, 103 close to their contacts 104A, 105A, thus the outputs from amplifiers 93, 94 are through connections 95, 96 applied to a pair of motors 180, 181 (FIGURE 2F). The motors 180, 181 have mechanical connections 185, 186, with differentials 62, 63 (FIGURE 2C). The purpose of this network will presently become apparent.

Referring again to FIGURE 2D, it will be observed that a resolver 200 is also arranged selectively to be electrically connected to output amplifier 25. The rotor of resolver 200 is connected to the wind direction shaft 23. In the instance when resolver 200 is operating, the switches 80 and 81 are closed to their contacts 80A and 80B and switches 190 and 191, 201 and 202 are switched to their contacts 190A, 191A, 201A, 202A respectively to bring the resolver 200 into the circuit. The output from the resolver 200 is applied on connections 87, 89 to amplifiers 93 and 94 (FIGURE 2G) and through switches 125, 126, 127 and 128 which have been moved to contact their terminals 125A, 126A, 127A and 128A respectively to bring motors 210 and 211 into the circuit. The signal from amplifier 93, 94 causes the motors 210, 211 to drive their shafts 212, 213 which are mechanically connected to the shafts 22, 23 (FIGURE 2D). Again the purpose of this network will presently become apparent.

On the panel of the instrument 13 there is a selector switch 13S which may select the mode of operation of the instrument, that is to say, the pilot may operate the switch to select a computing mode in which the circuits as described above are utilized to indicate range and bearing to a selected base, or the device may be switched to operate as a repeater for a radio compass (ADF) or from a TACAN. When the ADF mode or the TACAN mode is selected for the instrument the information from the computer is stored in the memories 60, 61.

If the ADF position is selected the pointer 13B becomes a repeater for the ADF signal as follows:

An ADF compass repeater 230 (FIGURE 2E) is electrically connected by connections 244, 245 through switches 241, 242 to a synchro 231 (FIGURE 2H). The synchro 231 transmits a signal on line 246 through switch 247 which has, on selection of ADF mode, been switched to its contact 247A to cause the amplifier 84 to send a signal to motor 108 to mechanically drive through connections 248 and differential 110 to position the pointer 13B in accordance with the ADF signal. The pointer 13B therefore in this mode acts as a radio compass repeater.

If the TACAN mode is selected bearing signals from the TACAN bearing unit 240B (FIGURE 2C) are applied on lines 254, 255 through switches 242, 241 (FIGURE 2E) to synchro 231. Synchro 231 drives the bearing indicator pointer 13B as before through amplifier 94 and motor 108. The range information is obtained from the TACAN unit 240R (FIGURE 2H). The signal from the unit 240R is applied to a range follow-up circuit consisting of a potentiometer 270 and summing resistors 271, 272. The difference signal from this network is applied on line 272 through switch 274 (FIGURE 2G) to amplifier 93 to cause motor 101 to drive the range counter 13R. Thus a TACAN range and bearing is displayed on the face of the instrument.

Throughout the operation of the instrument as a repeater for a radio compass or TACAN, the position computation continues and by altering the knob 13S to select the computing homing mode the display can revert to a position display at any time.

*Operation of the unit*

Let it be assumed that the pilot has set off from base and has selected on his selector 10 a particular station to which to fly, set the wind speed and direction on knobs 30 and 31 in accordance with the meterological report and is utilizing his air speed and heading inputs from his true airspeed computer 12 and his transmitting compass 46. During the flight the pilot observes a ground location known to him and by reference to a map finds that either his indicated bearing, his range, or both (as shown in his display unit 13) to his selected station is incorrect. Now it is open to the pilot to assume that either his meteorological wind information or his air data information is incorrect, in which case he may selectively decide to correct his air plot position or his wind information input.

In order to make the correction the pilot moves the selector button 13S (FIGURE 1) on the panel of the instrument to a "hold" position thereby cutting off the range and bearing amplifiers 93, 94 (FIGURE 2G) from the display. During this time input information with regard to air speed and heading are stored in the mechanical memories 60, 61 (FIGURE 2C). The pilot then by means of the range knob 112A and the bearing knob 110A (see FIGURE 2G) mechanically positions the range counter 13R and the bearing indicator 13B (FIGURES 1 and 2H) to set up the presentation of what he knows to be the correct range and bearing to his selected station. The movement of the range knob 112A and the bearing knob 110A of course mechanically positions the wipers 113 and 114 with the potentiometers 123, 124 and through the mechanical connection 130 (FIGURE 2G). The bearing knob 110A positions the shaft of the resolver 120. Although the pilot has corrected his presentation in polar coordinates it will be observed that the signal to the bridge 25 on lines 126, 127 will be in Cartesian coordinates and thus compatible with the other analogue inputs to the bridge.

Now if the pilot decides that his air data information is incorrect and he wishes to correct the computer he may, by selecting the PHI (Position Homing Indicator) position (hereinbefore referred to as the computing mode) for knob 13S and by pressing the range button 112A to momentarily operate a switch (not shown) alter the switches 80, 81 (FIGURE 2D), switch the fixed shaft resolver 170 to accept data from the bridge 25 which it will be observed has been unbalanced by the input signals of the correction via lines 126, 127. Wind potentiometers 36, 37 are reset to zero and this causes further unbalance of the bridge and thus the resolver 170 receives the difference signal from the bridge 25, applies a phase correction and applies the signals to the range and bearing amplifiers 93, 94 which through connections 95, 96 and 102, 103 operate the reset motors 180, 181 (FIGURE 2F) the motors 180, 181 in their turn apply on mechanical connections 185, 186 the corrected analogues to the differentials 62, 63 (FIGURE 2C) whereby to reposition the wipers 70, 71 thereby balancing the bridge 25.

This facility of enabling the pilot to correct his presentation and have the computer "look at" the corrected presentation and correct itself to the presentation is extremely useful since the pilot of a high speed aircraft cannot be expected to have the time to juggle slewing switches to correct a Cartesian coordinate computer where the presentation is in polar coordinates.

In the event that the pilot decides that his air plot information is good and that the wind information is erroneous he may elect by pressing either of the buttons 30, 31 to close contacts 30A, 31A to operate switches 190, 191 (FIGURE 2D). Wind potentiometers 36, 37 are not reset to zero and the bridge unbalance due to the change in the indicator range and bearing is corrected by bringing the resolver 200 on the wind direction shaft 23 into connection with the output signal from the bridge 25. The resolver 200, through switches 201, 202, applies the analogues converted to polar values through the amplifiers 93 and 94 (FIGURE 2G) to the wind motors 210, 211 which through mechanical connections 212, 213 reposition the shaft of the wind resolver 34 (FIGURE 2B) and the wipers 32, 33 whereby to provide a different wind output signal at the potentiometers 36, 37.

The correction having been made the wind lamp (FIGURE 2B) will go on. If the value of wind found, and displayed at the wind bearing and velocity indicators (FIGURE 2D) is not a reasonable one, the pilot now has the option, since at this stage the bridge is "looking at" the indicated wind values, of restoring the previous wind or inserting any reasonable wind values by altering the wind knobs 30, 31. The alteration made will now be reflected in a change in the indicator range and bearing. That is to say that the wind which has been selected as the most likely value causes an unbalance in the bridge 25, which in its turn causes amplifiers 93 and 94 to operate motors 101, 108 to position the range and bearing indicators 13R and 13B. The air data potentiometers 70 and 71 are not changed and the new wind applies over the time elapsed since the previous fix. When knob 13S is returned to PHI position the information stored in the memories 60, 61 is fed back into the bridge 25 so no loss of air data is experienced.

Let it be assumed that the pilot wishes to set in a wind value, possibly due to a change in altitude, he accomplishes this by pressing buttons 30 and 31 and adjusting wind potentiometers 32, 33 accordingly. Either switch 30A or 31A is thereby closed; the wind potentiometers 36, 37 are not reset to zero but the bridge 25 is now rebalanced by the reset motors 180, 181 which alter the setting of the potentiometers 70, 71 to correct the unbalance caused by the alteration of the wind vector.

If the pilot has taken off without a knowledge of the wind, he may wish at a later time, when a good wind value has been given to him, to set it into the unit so that his plot may be corrected for wind. In order to have his plot corrected for wind the wind value needs to be applied for the elapsed flight time rather than from the instant of obtaining the wind value, as in the immediately aforegoing case. In order therefore that the computer may "look at" the wind setting, the pilot proceeds as if he were attempting to find a wind but he presses the indicator range button 112A without altering the range value. In this case there is no bridge unbalance and therefore no movement of the wind speed and wind direction wipers 32, 33. When the sequence has been completed as indicated by the wind lamp coming on, that is to say when the condition exists that the device is "looking at" the wind indication the desired wind values are inserted. The position change due to the changed wind will now be shown on the indicator.

What we claim as our invention is:

1. A navigational computer adapted to receive an input analogue of aircraft true air speed; resolving means adapted to receive said analogue, means for generating an input analogue of grivation compatible with said analogue of true air speed and applying the same to said resolving means; means operable on a time base to provide an analogue of elapsed time to said resolving means whereby to produce analogue signals therefrom of the Cartesian coordinates of aircraft distance travel along heading; memory means adapted to receive, and on selection to store, said analogue and to apply said analogue to differential means; bridge means adapted to receive the analogue as an input from said differential means; means for setting manually into a second resolving means the analogue signals of wind speed and wind direction whereby said resolving means provides outputs of the Cartesian coordinates of wind vector; means operable on a time base for providing a multiple factor of elapsed time; means for multiplying the wind vector analogue by the elapsed time factor whereby to produce an analogue of accumulated wind vector during flight duration; means for applying said last mentioned analogue as an input to said bridge means; means for generating an analogue signal of the Cartesian coordinates of a selected geographical reference relative to a map grid datum and for applying said analogue as an input to said bridge means; visual indicator means for indicating the instantaneous bearing of the aircraft relative to said selected geographical reference; feed back servo means adapted to apply to said bridge means the analogue signal of indicated bearing; visual means adapted to indicate the instantaneous range of the aircraft relative to said geographical reference; feed back servo means adapted to apply to said bridge means the analogue signal of indicated range, whereby said bridge means produces a difference signal analogous to the instantaneous value of the Cartesian coordinates of the selected geographical reference relative to the aircraft air position; third, fourth and fifth resolving means; switching means adapted to apply the difference signal to one of said third, fourth or fifth resolving means whereby to convert said signal into polar coordinates; amplifying means adapted to receive the output signal of polar coordinates from one of said third, fourth or fifth resolving means whereby to transmit command analogue signals of range and of bearing; motor means responsive to said command signals to position said visual bearing indicator and said visual range indicator means to indicate visually the instantaneous value of bearing and range of the aircraft to said selected geographical reference; switching means adapted to selectively operate one of the third or fourth resolving means and to operate said memory to store the incoming analogues thereto and to, on selection of said third resolving means, permit of a manual correction of wind direction at said third resolving means, and on selection of said fourth resolving means to permit of a manual correction of air position; and motor driven feed back servo loops for said third and fourth resolving means adapted to relay the corrected analogue signals, respectively, on selection to said second resolving means and to said differential means.

2. Apparatus as claimed in claim 1 in which said means for generating an analogue signal of the Cartesian coordinates of the selected geographical reference include a plurality of selectable means adapted to generate analogue signals of the Cartesian coordinates of a plurality of geographical references relative to a common map grid datum.

3. Apparatus as claimed in claim 1 in which switch means is provided to energize the memory means and to drive said visual bearing indicator means in response to a derived signal from a radio compass means.

4. Apparatus as claimed in claim 1 in which switch means is provided to energize the memory means and to drive said visual bearing and range indicator means in response to a derived signal from a TACAN receiver.

5. A navigational computer comprising bridge means adapted to receive as a first input the analogue of Cartesian coordinates of a selected geographical reference relative to a map grid datum; as a second input the analogue signal of the Cartesian coordinates of air distance travelled along the aircraft heading and as a third input the analogue of the Cartesian coordinates of the accumulated wind speed and direction vector for the duration of the aircraft's flight, said bridge means being adapted to sum these input analogues and to produce an output signal analogous to the instantaneous value of the Cartesian coordinates of the selected geographical reference relative to the aircraft's position, resolving means adapted to receive the said output signal and convert it into analogues of polar coordinates of instantaneous range and instantaneous bearing of the aircraft relative to the selected geographical reference, means utilizing said analogue signal of the polar coordinates of instantaneous bearing to drive the reference pointer to visually indicate the instantaneous bearing to the selected geographical reference, means adapted to utilize as a command signal the analogue signal of polar coordinate of instantaneous range to drive means to position range counter means whereby to viusally indicate the instantaneous range of the aircraft to the selected geographical reference, memory means selectable to store the said second input, manual means operable to position the reference pointer, manual means operable to position the said range counter means and resolver means operatively connected to said reference pointer and to said range counter adapted to generate an anlogue signal of the Cartesian coordinates of manual setting of range and bearing and means for applying said last-mentioned analogue signal to said bridge means whereby the computer operator may cause the computer to compare with a manually corrected range and bearing presentation and selectively correct either of said second input or said third input to balance said bridge.

6. An aircraft navigational computer comprising bridge means adapted to receive as a first input the analogue of the Cartesian coordinates of a selected geographical reference relative to a map grid datum; as a second input the analogue signal of the Cartesian coordinates of distance travelled along the aircraft heading, and as a third input the analogue of the Cartesian coordinates of the accumulated wind speed and direction vector for the duration of the aircraft's flight, means for generating said third input, said means including a manual control means for setting into the computer a signal analogous to wind speed, means for indicating the value of said wind speed and manual means for setting into said computer a signal analogous with wind direction, means for indicating said wind direction, resolving means for resolving the input analogues of wind speed and wind direction into Cartesian coordinates of wind vector, and time base means supplying a time multiplication factor to said vector whereby to generate said third input to said bridge means; said bridge means being adapted to sum these input analogues and to produce an output signal analogous to the instantaneous value of the Cartesian coordinates of the selected geographical reference relative to the aircraft's position, resolving means adapted to receive the said output signal and convert it into analogues of polar coordinates of instantaneous range and instantaneous bearing of the aircraft relative to the selected geographical reference, means utilizing said analogue signal of the polar coordinates of instantaneous bearing to drive the reference pointer to visually indicate the instantaneous bearing to the selected geographical reference, means adapted to utilize as a command signal the analogue signal of polar coordinate of instantaneous range to drive means to position range counter means whereby to visually indicate the instantaneous range of the aircraft to the selected geographical reference, memory means selectable to store the second input, manual means operable to position the reference pointer, manual means operable to position the said range counter means, and resolver means operatively connected to said reference pointer and to said wind counter adapted to generate an analogue signal of the Cartesian coordinates of manual setting or range and bearing and means for applying said last-mentioned analogue signal to said bridge means to unbalance said bridge, and means responsive to the out of balance signal from said bridge to alter said input analogue of wind vector value to balance said bridge and to indicate the value of the wind speed and direction thus found.

7. An aircraft navigational computer comprising bridge means adapted to receive as a first input the analogue of the Cartesian coordinates of a selected geographical reference relative to a map grid datum; as a second input the analogue signal of the Cartesian coordinates of distance travelled along the aircraft heading, and as a third input the analogue of the Cartesian coordinates of the accumulated wind speed and direction vector for the duration of the aircraft's flight, means for generating said third input, said means including a manual control means for setting into the computer a signal analogous to wind speed, means for indicating the value of said wind speed and manual means for setting into said computer a signal analogous with wind direction, means for indicating said wind direction, resolving means for resolving the input analogues of wind speed and wind direction into Cartesian coordinates of wind vector, and time base means supplying a time multiplication factor to said vector whereby to generate said third input to said bridge means; said bridge means being adapted to sum these input analogues and to produce an output signal analogous to the instantaneous value of the Cartesian coordinates of the selected geographical reference relative to the aircraft's position, resolving means adapted to receive the said output signal and convert it into analogues of polar coordinates of instantaneous range and instantaneous bearing of the aircraft relative to the selected geographical reference, means utilizing said analogue signal of the polar coordinates of instantaneous bearing to drive the reference pointer to visually indicate the instantaneous bearing to the selected geographical reference, means adapted to utilize as a command signal the analogue signal of polar coordinate of instantaneous range to drive means to position range counter means whereby to visually indicate the instantaneous range of the aircraft to the selected geographical reference, means responsive to a difference signal from said bridge to drive means to alter the value of the second input to said bridge, whereby the manual operation of the means for setting into the computer the signal analogues to wind speed and wind direction unbalances the bridge which is rebalanced by the alteration of the second input analogue signal thereto.

8. An aircraft navigational computer comprising bridge means adapted to receive as a first input the analogue of the Cartesian coordinates of a selected geographical reference relative to a map grid datum; as a second input the analogue signal of the Cartesian coordinates of distance travelled along the aircraft heading, and as a third input the analogue of the Cartesian coordinates of the accumulated wind speed and direction vector for the duration of the aircraft's flight, means for generating said third input, said means including a manual control means for setting into the computer a signal analogous to wind speed, means for indicating the value of said wind speed and manual means for setting into said computer a signal analogous with wind direction, means for indicating said wind direction, resolving means for resolving the input analogues of wind speed and wind direction into Cartesian coordinates of wind vector, and time base means supplying a time multiplication factor to said vector whereby to generate said third input to said bridge means, said bridge means being adapted to sum these input analogues and to produce an output signal analogous to the instantaneous value of the Cartesian coordinates of the selected geographical reference relative to the aircraft's position, resolving means adapted to receive the said output signal and convert it into analogues of polar coordinates of instantaneous range and instantaneous bearing of the aircraft relative to the selected geographical reference, means utilizing said analogue signal of the polar coordinates of instantaneous bearing to drive the reference pointer to visually indicate the instantaneous bearing to the selected geographical reference, means adapted to utilize as a command signal the analogue signal of polar coordinate of instantaneous range to drive means to position range counter means whereby to visually indicate the instantaneous range of the aircraft to the selected geographical reference, whereby said wind vector value may be altered during flight and caused, by said time multiplication factor, to apply throughout the flight duration.

9. A navigational computer of the type which visually presents the instantaneous range, on a visual indicator, and instantaneous bearing, by means of a pointer, to a selected geographical reference comprising an air plot sub computer providing an analogue signal of distance travelled along the aircraft heading in Cartesian form; a wind plot sub computer providing an analogue signal in Cartesian form of the accumulated wind speed and direction for the duration of the aircraft's flight; a command vector generator providing a signal analogous to the Cartesian coordinates of a selected geographical reference relative to a map grid datum; means for balancing these three analogues to produce an output signal analogous to the instantaneous value of the Cartesian coordinates of the selected geographical reference relative to the aircraft position; means for converting the output signal into polar coordinates and generating analogues of instantaneous range and instantaneous bearing of the aircraft relative to the selected geographical reference; drive means for utilizing the generated signal for instantaneous bearing to position the pointer; and drive means to utilize the generated signal of instantaneous range to position the visual indicator to indicate the instantaneous range.

10. A computer as claimed in claim 9 further comprising switch means operable to disconnect the drive means from the pointer and the visual indicator, and to permit manual aljustment of the presentation; and feedback means operable to generate an error signal to cause the balancing means to detect the adjustment and to apply a correcting signal to a selected one of the sub computers whereby to balance the balancing means.

References Cited by the Examiner
UNITED STATES PATENTS 2,911,143 11/59 Wright _____ 235—187 X
2,943,321 6/60 Karpeles _____ 235—187 X MALCOLM A. MORRISON, *Primary Examiner.*
CORNELIUS D. ANGEL, *Examiner.*